United States Patent
Deng et al.

(10) Patent No.: US 11,340,076 B2
(45) Date of Patent: May 24, 2022

(54) SHOPPING CART, POSITIONING SYSTEM AND METHOD, AND ELECTRONIC EQUIPMENT

(71) Applicant: BOE TECHNOLOGY GROUP CO., LTD., Beijing (CN)

(72) Inventors: Wei Deng, Beijing (CN); Hongyan Pei, Beijing (CN); Xin Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 364 days.

(21) Appl. No.: 16/435,013

(22) Filed: Jun. 7, 2019

(65) Prior Publication Data
US 2020/0018603 A1   Jan. 16, 2020

(30) Foreign Application Priority Data

Jul. 13, 2018   (CN) .......................... 201810772320.7

(51) Int. Cl.
| | |
|---|---|
| *G01C 21/20* | (2006.01) |
| *H04W 4/024* | (2018.01) |
| *G06Q 30/06* | (2012.01) |
| *G06V 20/10* | (2022.01) |
| *G06F 16/29* | (2019.01) |

(52) U.S. Cl.
CPC ....... *G01C 21/206* (2013.01); *G06Q 30/0639* (2013.01); *G06V 20/10* (2022.01); *H04W 4/024* (2018.02); *G06F 16/29* (2019.01)

(58) Field of Classification Search
CPC .............. G01C 21/206; H04W 4/024; G06K 9/00664; G06Q 30/0639; G06F 16/29; G06V 20/10

See application file for complete search history.

(56) References Cited

U.S. PATENT DOCUMENTS 9,164,511 B1 * 10/2015 Ferguson ................ G01S 13/02
10,552,750 B1 * 2/2020 Raghavan .............. G06N 5/048
(Continued)

FOREIGN PATENT DOCUMENTS

| CN | 107063265 A | * | 8/2017 |
| CN | 107609703 A | | 1/2018 |
(Continued)

OTHER PUBLICATIONS

First Office Action dated Oct. 22, 2021 for application No. CN201810772320.7 with English translation attached.

*Primary Examiner* — Hunter B Lonsberry
*Assistant Examiner* — Harrison Heflin
(74) *Attorney, Agent, or Firm* — Nath, Goldberg & Meyer; Joshua B. Goldberg

(57) ABSTRACT

The present disclosure provides a positioning system, a positioning method, a shopping cart and an electronic equipment. The system includes an image acquisition device and a processing device. The image acquisition device is configured to acquire image information about a shopping cart, and the processing device is configured to process the image information so as to acquire identification information of the shopping cart, determine a location area of the shopping cart in an image according to the identification information, and determine location information of the shopping cart according to location information of the image acquisition device and the location area of the shopping cart in the image.

17 Claims, 7 Drawing Sheets

(56) References Cited

U.S. PATENT DOCUMENTS

| | | | |
|---|---|---|---|
| 2008/0128374 A1* | 6/2008 | Kyutoku | B66C 13/08 |
| | | | 212/276 |
| 2014/0006229 A1 | 1/2014 | Birch et al. | |
| 2015/0133091 A1* | 5/2015 | Baldwin | H04W 4/029 |
| | | | 455/414.1 |
| 2016/0368143 A1* | 12/2016 | Tang | G05B 19/00 |
| 2017/0357939 A1 | 12/2017 | Jones et al. | |
| 2018/0053231 A1* | 2/2018 | Clark | G01S 17/931 |
| 2018/0089749 A1* | 3/2018 | Biermann | G06F 16/29 |
| 2018/0222514 A1* | 8/2018 | Jones | G01C 21/206 |
| 2019/0178659 A1* | 6/2019 | DeLuca | G01C 21/3626 |

FOREIGN PATENT DOCUMENTS

| | | | |
|---|---|---|---|
| CN | 107767170 A | | 3/2018 |
| CN | 107784306 A | | 3/2018 |
| CN | 208149407 U | * | 11/2018 |
| JP | 2001088912 A | * | 4/2001 |
| WO | 2017192826 A1 | | 11/2017 |

* cited by examiner

SHOPPING CART, POSITIONING SYSTEM AND METHOD, AND ELECTRONIC EQUIPMENT

CROSS-REFERENCE TO RELATED APPLICATION

The present disclosure claims the priority of Chinese Patent Application No. 201810772320.7 filed on Jul. 13, 2018, the contents of which are incorporated herein in their entirety by reference.

TECHNICAL FIELD

The present disclosure relates to the field of intelligent control technology, and in particular to a shopping cart, a positioning system, a positioning method, and an electronic equipment.

BACKGROUND

With the development of intelligent terminals and internet of things technology, a new retail model represented by self-service shelves and self-service supermarkets has been applied in almost every aspect of customer life. In order to improve user experience, one of technical problems to be solved is how to perform a function of positioning a shopping cart in a supermarket.

Existing indoor positioning systems are mainly based on technologies of Bluetooth, WIFI and UMB (Ultra Mobile Broadband). However, Bluetooth and WIFI positioning modules are susceptible to obstacles, which will result in reduction of positioning accuracy; while UMB positioning systems require construction of base stations, which will result in high cost. Therefore, neither of the above indoor positioning systems is suitable for positioning of the shopping carts in the supermarkets.

SUMMARY

One aspect of the present disclosure provides a shopping cart, including an identification signal generation device configured to generate identification information; and a control device configured to control the identification signal generation device to generate the identification information.

According to embodiments of the present disclosure, the shopping cart may further include a signal transceiver and a navigation signal generation device, wherein the signal transceiver is configured to send a navigation request and receive target navigation path control information, the control device is further configured to generate a navigation path signal according to the target navigation path control information, and the navigation signal generation device is configured to generate a navigation signal according to the navigation path signal.

According to embodiments of the present disclosure, the navigation signal generation device may include a navigation ray generation unit configured to generate navigation rays according to the navigation path signal; and a direction control unit configured to control a direction of the navigation ray generation unit according to the navigation path signal.

According to embodiments of the present disclosure, the navigation ray generation unit may be a laser generator, and the direction control unit may be a steering gear on which the laser generator may be mounted. The navigation path signal may include a start/shutdown signal for the laser generator and a rotation angle signal for the steering gear.

According to embodiments of the present disclosure, the shopping cart may further include a direction detection unit configured to detect a direction of the shopping cart.

According to embodiments of the present disclosure, the signal transceiver may be further configured to receive a navigation end instruction, and the control device may be further configured to control the identification signal generation device to stop generating the identification information according to the navigation end instruction, and control the navigation signal generation device to stop generating the navigation signal.

Another aspect of the present disclosure provides a positioning system including the shopping cart of the present disclosure, and the positioning system further includes an image acquisition device configured to acquire image information about the shopping cart; and a processing device connected with the image acquisition device and configured to process the image information so as to acquire identification information of the shopping cart, determine a location area of the shopping cart in an image according to the identification information, and determine location information of the shopping cart according to location information of the image acquisition device and the location area of the shopping cart in the image.

According to embodiments of the present disclosure, the positioning system may further include a signal transceiver configured to receive a navigation request sent by the shopping cart, and send target navigation path control information to the shopping cart, and the processing device may be further configured to generate the target navigation path control information according to the location information of the shopping cart and the navigation request.

According to embodiments of the present disclosure, the processing device may include a location information database configured to store an electronic map; an image recognition module configured to identify the image information, determine shopping cart identification, acquire the identification information of the shopping cart from the shopping cart identification, and determine the location area of the shopping cart in the image according to the identification information; and a positioning module configured to determine location information of the shopping cart in the electronic map according to the location information of the image acquisition device and the location area of the shopping cart in the image.

According to embodiments of the present disclosure, the shopping cart identification may be color identification or optical frequency identification.

According to embodiments of the present disclosure, the processing device may further include a navigation path planning module configured to plan a navigation path according to the location information of the shopping cart and the navigation request; and a control information generation module configured to generate the target navigation path control information according to the navigation path.

According to embodiments of the present disclosure, the processing device may further include a destination detection module configured to determine whether the shopping cart arrives at a target location according to the location information and the navigation request, and generate a navigation end instruction in response to the shopping cart arriving at the target location.

According to embodiments of the present disclosure, in response to recognition of no shopping cart identification in the image information, the image recognition module may recognize goods information contained in the image information.

According to embodiments of the present disclosure, the processing device may further include an information analysis module configured to analyze the goods information, and upload an analysis result to a back-end server.

Another aspect of the present disclosure provides a positioning method, including acquiring, by an image acquisition device, image information about a shopping cart; processing the image information to acquire identification information of the shopping cart; determining a location area of the shopping cart in an image according to the identification information; and determining location information of the shopping cart according to location information of the image acquisition device and the location area of the shopping cart in the image.

According to embodiments of the present disclosure, the positioning method may further include acquiring a navigation request sent by the shopping cart; planning a navigation path according to the location information and the navigation request; generating target navigation path control information according to the navigation path; and sending the target navigation path control information to the shopping cart.

According to embodiments of the present disclosure, the positioning method may further include recognizing goods information contained in the image information in response to recognition of no identification information in the image information.

According to embodiments of the present disclosure, the positioning method may further include analyzing the goods information, and uploading an analysis result to a back-end server.

Another aspect of the present disclosure provides an electronic equipment, including at least one processor; and a memory communicating with the at least one processor, wherein instructions are stored in the memory, and the positioning method of the present disclosure is performed when the at least one processor executes the instructions.

Another aspect of the present disclosure provides a computer readable storage medium with computer programs stored thereon, wherein the positioning method of the present disclosure is performed when the computer programs are executed by a processor.

BRIEF DESCRIPTION OF THE DRAWINGS

For illustrating the technical solutions of the embodiments of the present disclosure clearly, drawings required for illustrating the embodiments will be briefly described below. Obviously, the drawings described below are only for some embodiments of the present disclosure. Based on these drawings, those of ordinary skill in the art can obtain other drawings without any creative work. In the drawings.

DETAILED DESCRIPTION

In order to make the purposes, the technical solutions and the advantages of the present disclosure clearer, the present disclosure will be described in detail below in conjunction with specific embodiments and drawings.

It should be noted that "first" and "second" used in description of all embodiments of the present disclosure are just for differentiating between two entities or parameters, that is, just for ease of expression, and thus should not be considered to make limitation to the embodiments of the present disclosure.

Figure 1:
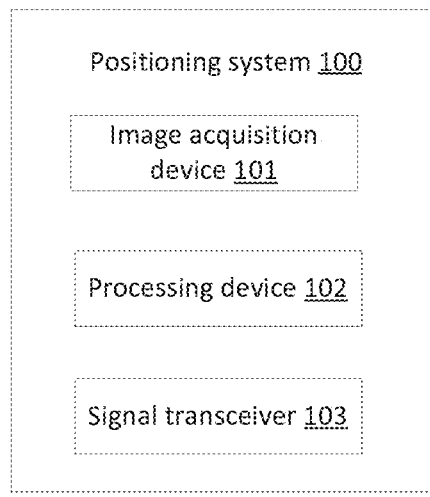
FIG. 1 is a schematic structural diagram of a positioning system according to the embodiments of the present disclosure.

According to embodiments of the present disclosure, a positioning system is provided for achieving positioning of shopping carts in shopping places such as supermarkets. FIG. 1 is a schematic structural diagram of a positioning system according to the embodiments of the present disclosure.

As shown in FIG. 1, a positioning system 100 according to the embodiments of the present disclosure may include an image acquisition device 101 and a processing device 102.

The image acquisition device 101 is configured to acquire image information about a shopping cart.

It is possible to arrange a plurality of image acquisition devices in specific locations in a supermarket, for example, above each shelf, at an entrance or an exit. The image acquisition device in each location is capable of acquiring images, which may contain information about shopping carts, goods and people, within its shooting range. In an embodiment, the image acquisition device may be a device having an image and video information acquiring function, such as a camera.

The processing device 102 may be connected with the image acquisition device 101, and is configured to process the image information so as to acquire identification information of the shopping cart, determine a location area of the shopping cart in an image according to the identification information, and determine location information of the shopping cart according to location information of the image acquisition device and the location area of the shopping cart in the image.

The processing device 102 may be connected with the image acquisition device 101 in a wired or wireless way, so as to realize data transmission therebetween.

Identification information of a shopping cart may be sent out by an identification signal generation device mounted on the shopping cart. The image information acquired by the image acquisition device 101 may contain information about one or more shopping carts. Identification information of a shopping cart to be positioned may be sent out by an identification signal generating device of the shopping cart, and the image information acquired by the image acquisition device 101 may contain such identification information. The processing device 102 processes the image information so as to acquire the identification information, identifies the shopping cart corresponding to the identification information (i.e., the shopping cart which sends out the identification information) according to the identification information, and further determines a location area of the shopping cart in an image. Moreover, the processing device 102 may roughly determine an area of the shopping cart in the supermarket according to a location of the image acquisition device 101 (i.e., the location information of the image acquisition device 101), and further determines a specific location of the shopping cart according to the location area of the shopping cart in the image, that is, determines a location of the shopping cart in the supermarket, thereby positioning the shopping cart.

A process of performing a function of positioning the shopping cart by the processing device 102 according to the image information acquired by the image acquisition device 101 is described below in the form of specific modules.

Figure 2:
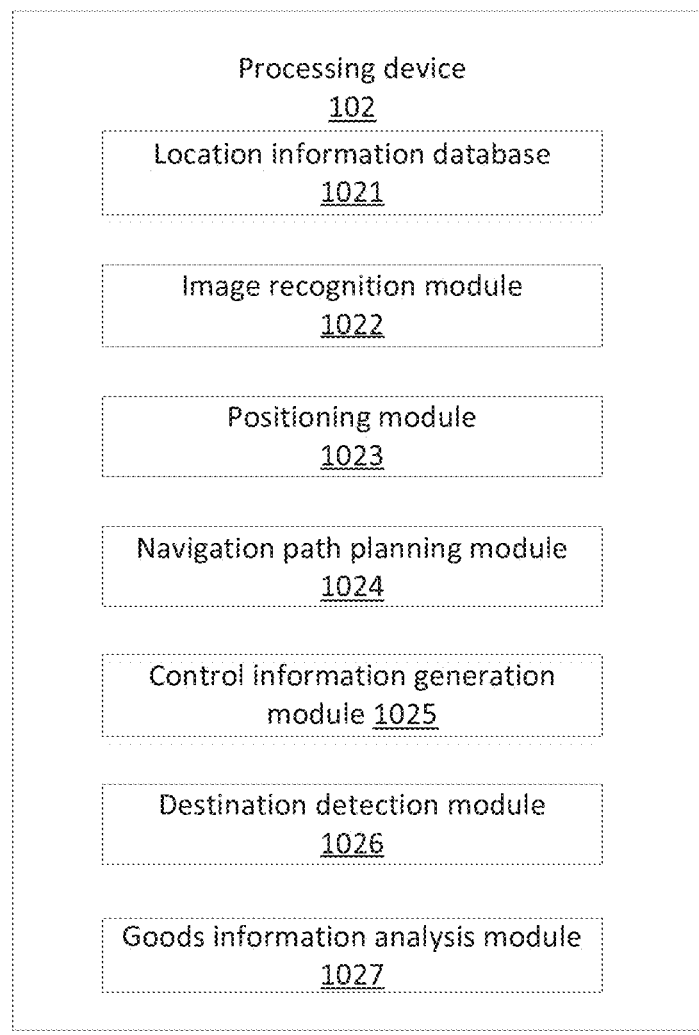
FIG. 2 is a schematic structural diagram of a processing device of the positioning system shown in FIG. 1.

FIG. 2 is a schematic structural diagram of the processing device 102 of the positioning system 100 shown in FIG. 1.

As shown in FIG. 2, the processing device 102 may include a location information database 1021, an image recognition module 1022 and a positioning module 1023.

The location information database 1021 is configured to store an electronic map. The electronic map includes, for example, an electronic map of supermarket layout, which shows locations of all shelves, all devices (including the image acquisition devices), counters, goods and passages in a supermarket.

The image recognition module 1022 is configured to identify the image information, determine shopping cart identification, acquire the identification information of the shopping cart from the shopping cart identification, and determine the location area of the shopping cart in the image according to the identification information.

The image recognition module 1022 recognizes the shopping cart identification from the image information acquired by the image acquisition device 101. The shopping cart identification may be color identification, optical frequency identification or other identification capable of identifying the shopping cart. The image recognition module 1022 acquires the identification information of the shopping cart from the shopping cart identification. The identification information is unique to a shopping cart, for example, if the shopping cart identification is color identification, identification information of shopping cart A is red, and identification information of shopping cart B blue; or, if the shopping cart identification is optical frequency identification, the identification information of shopping cart A is an optical signal with a first frequency, and the identification information of shopping cart B is an optical signal with a second frequency. The image recognition module 1022 determines the shopping cart corresponding to the identification information according to the identification information, and further determines the location area of the shopping cart in the image.

The positioning module 1023 is configured to determine location information of the shopping cart in the electronic map according to the location information of the image acquisition device 101 and the location area of the shopping cart in the image.

The positioning module 1023 may roughly determine an area of the shopping cart in the electronic map according to the location information of the image acquisition device 101 in the electronic map, and further determines a specific location of the shopping cart in the electronic map according to the location area of the shopping cart in the image acquired by the image acquisition device 101, that is, finds out a current location of the shopping cart in the electronic map.

The positioning system according to the embodiments of the present disclosure may further perform a function of navigating a shopping cart. Still referring to FIG. 1, the positioning system 100 may further include a signal transceiver 103.

The signal transceiver 103 is configured to receive a navigation request sent by a shopping cart, and send target navigation path control information to the shopping cart. Moreover, the processing device 102 may be configured to generate the target navigation path control information according to location information of the shopping cart and the navigation request.

A shopping cart may be provided with an operation and display terminal, through which a navigation request including target location information may be generated by a user. For example, the operation and display terminal may display goods lists containing all goods in a supermarket, a user may select target goods from the goods lists, and then a navigation request is generated according to a target location of the target goods. In addition, it is possible to determine the target goods according to an input goods name, an imported goods picture, or written description of goods, and then generate a navigation request.

The processing device 102 of the positioning system receives the navigation request via the signal transceiver 103, determines a navigation path from a current location of the shopping cart to the target location according to the location information of the shopping cart and the target location included in the navigation request. Then, the processing device 102 may generate the target navigation path control information according to the determined navigation path to control a path of the shopping cart from the current location e target location.

A process of generating the target navigation path control information by the processing device 102 according to the location information of the shopping cart and the navigation request sent by the shopping cart is described below in the form of specific modules.

Still referring to FIG. 2, the processing device 102 may further include a navigation path planning module 1024 and a control information generation module 1025.

The navigation path planning module 1024 is configured to plan a navigation path according to the location information of the shopping cart and the navigation request.

The navigation path planning module 1024 may plan a navigation path from the current location of the shopping cart to the target location according to the current location of the shopping cart found by the positioning module 1023 and the target location included in the navigation request sent by the shopping cart.

In the embodiment, the navigation path is planned by taking the current location of the shopping cart in the electronic map as a starting location, and taking the target location included in the navigation request as an end location, and the planned navigation path may be shown in the electronic map. There may be a plurality of planned navigation paths capable of being separately shown in the electronic map, so that one of there may be selected as a final navigation path. Moreover, the plurality of planned navigation paths may be sent to the operation and display terminal of the shopping cart through the signal transceiver 103, so as to allow a user to watch those navigation paths on the operation and display terminal and select one as the final navigation path.

The control information generation module 1025 is configured to generate the target navigation path control information according to the navigation path.

The control information generation module 1025 may generate the target navigation path control information according to the final navigation path, so as to control the path of the shopping cart from the current location to the target location.

A navigation process may be terminated when the shopping cart arrives at the target location according to the target navigation path control information. For such purpose, the processing device 102 may further include a destination detection module 1026.

The destination detection module 1026 is configured to determine whether the shopping cart arrives at the target location according to the location information and the navigation request, and generate a navigation end instruction in response to the shopping cart arriving at the target location.

When the shopping cart arrives at the target location, the destination detection module 1026 may determine that the shopping cart has arrived at the target location according to a current location of the shopping cart found by the positioning module 1023 and the target location included in the navigation request, and generate the navigation end instruction. The shopping cart may terminate the navigation process according to the navigation end instruction.

The positioning system according to the embodiments of the present disclosure may be further applied to goods management. For such purpose, the processing device 102 may further include an information analysis module 1027.

If the image recognition module 1022 recognizes no shopping cart identification from the image information, the image recognition module 1022 will recognize goods information contained in the image information, and the information analysis module 1027 processes and analyzes the goods information.

When the image recognition module 1022 determines that the image contains no shopping cart identification after identifying the image information (i.e., there is no need to position a shopping cart), the goods information contained in the image information may be recognized by the image recognition module 1022, and analyzed and processed by the information analysis module 1027, so as to achieve management of goods on the shelves. For example, it is possible to analyze to find out whether the goods on the shelves are out of stock, broken or placed in wrong locations according to the recognized goods information, and upload the analysis result to a back-end server for goods management and early warning.

Figure 3:
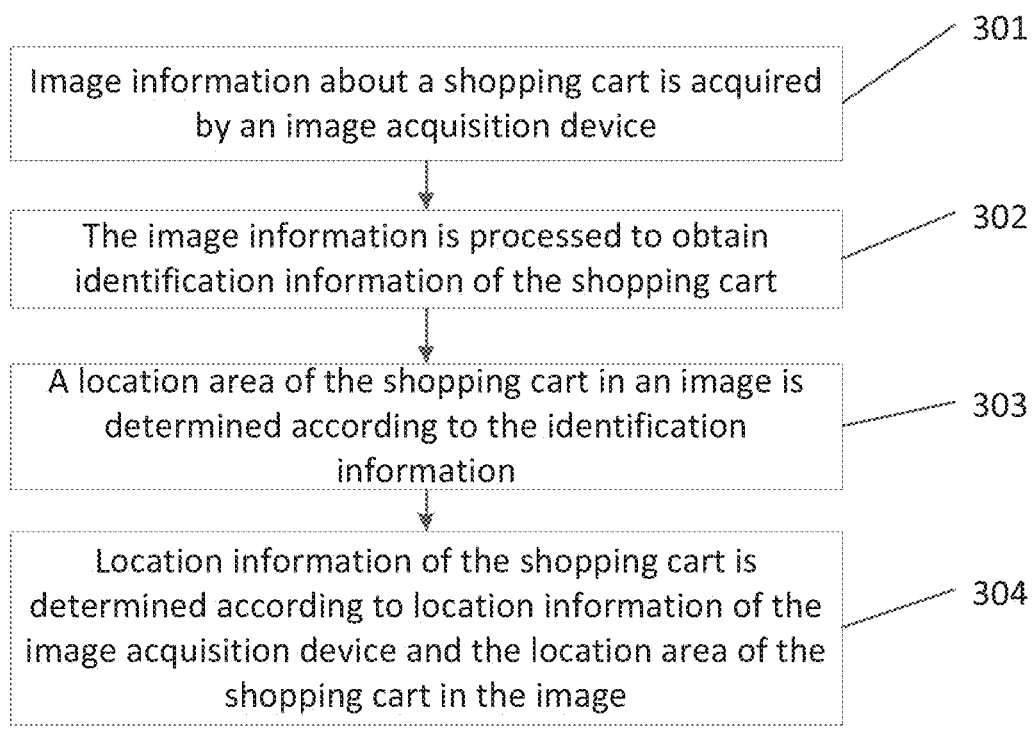
FIG. 3 is a flow chart illustrating a positioning method according to the embodiments of the present disclosure.

Based on the aforesaid positioning system, the embodiments of the present disclosure further provide a positioning method. FIG. 3 is a flow chart illustrating the positioning method according to the embodiments of the present disclosure.

As shown in FIG. 3, the positioning method according to the embodiments of the present disclosure may include Steps 301-304.

In Step 301, image information about a shopping cart is acquired by an image acquisition device.

In Step 302, the image information is processed to acquire identification information of the shopping cart.

In Step 303, a location area of the shopping cart in an image is determined according to the identification information.

In Step 304, location information of the shopping cart is determined according to location information of the image acquisition device and the location area of the shopping cart in the image.

In the embodiments of the present disclosure, each of the image acquisition devices arranged in specific locations in a supermarket is capable of acquiring images, which may contain information about shopping carts, goods and people, within its shooting range, respectively. For a shopping cart to be positioned, an identification signal generation device on the shopping cart sends out identification information, and the image acquisition device acquires image information. When the image information contains a shopping cart and identification information of the shopping cart, the image information is identified to recognize shopping cart identification and the identification information of the shopping cart, the shopping cart corresponding to the identification information is determined, and a location area of the shopping cart in an image is further determined. An area of the shopping cart in the supermarket is roughly determined according to location information of the image acquisition device, and then a specific location of the shopping cart in the supermarket is determined according to the determined location area of the shopping cart in the image acquired by the image acquisition device, thereby performing the function of positioning the shopping cart.

Figure 4:
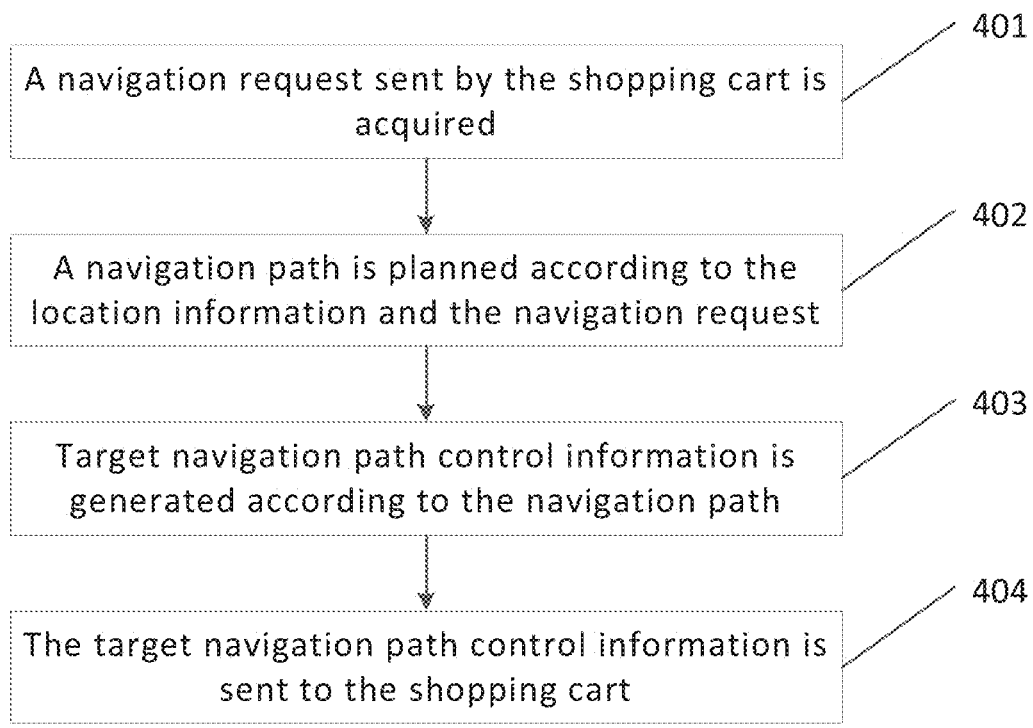
FIG. 4 is a flow chart illustrating a process of performing a navigation function with the positioning method according to the embodiments of the present disclosure.

The positioning method according to the embodiments of the present disclosure may be further applied to performing a function of navigating a shopping market. FIG. 4 is a flow chart illustrating a process of performing the navigation function with the positioning method according to the embodiments of the present disclosure.

As shown in FIG. 4, the positioning method according to the embodiments of the present disclosure may further include Steps 401-404.

In Step 401, a navigation request sent by the shopping cart acquired.

In Step 402, a navigation path is planned according to the location information and the navigation request.

In Step 403, target navigation path control information is generated according to the navigation path.

In Step 404, the target navigation path control information is sent to the shopping cart.

A user generates the navigation request including target location information with an operation and display terminal of the shopping cart. After receiving the navigation request sent by the shopping cart, a processing device of a positioning system determines a current location of the shopping cart according to the determined location information of the shopping cart, determines a target location to be reached by the shopping cart according to the navigation request, provides a plan of a navigation path of the shopping cart from the current location to the target location according to the current and target locations, generates the target navigation path control information according to the planned navigation path for controlling movement of the shopping cart from the current location to the target location, and sends the target navigation path control information to the shopping cart.

The positioning method according to the embodiments of the present disclosure may be further applied to goods management.

The positioning method according to the embodiments of the present disclosure may further include recognizing goods information contained in the image information in response to recognition of no identification information in the image information, analyzing and processing the goods information, and uploading an analysis result to a back-end server.

If the image information contains no identification information, which indicates that there is no need to position a shopping cart, the goods information contained in the image information may be processed and analyzed for goods management. For example, the goods information is analyzed to find out whether the goods on the shelves are out of stock, broken or placed in wrong locations, and then the analysis result is uploaded to the back-end server for goods management and early warning.

Figure 5:
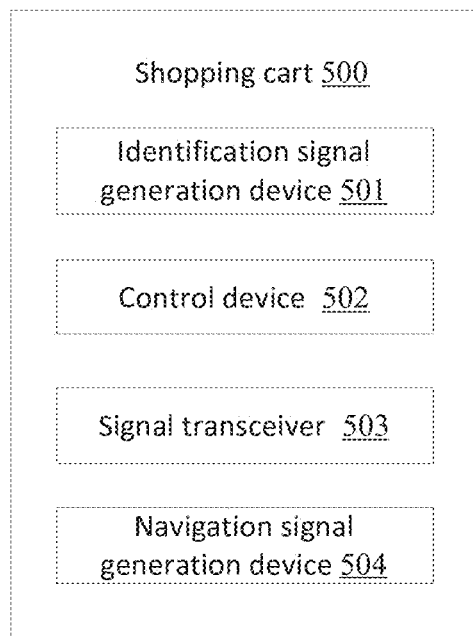
FIG. 5 is a schematic structural diagram of a shopping cart according to the embodiments of the present disclosure.

FIG. 5 is a schematic structural diagram of a shopping cart according to the embodiments of the present disclosure.

As shown in FIG. 5, the shopping cart 500 according to the embodiments of the present disclosure includes an identification signal generation device 501 configured to generate identification information, and a control device 502 configured to control the identification signal generation device 501 to generate the identification information.

The control device 502 controls the identification signal generation device 501 to generate the identification information, so that an image acquisition device of a positioning system may acquire image information containing a shopping cart and identification information of the shopping cart. The identification signal generation device 501 may be an optical signal generator capable of generating optical signals with different frequencies or in different colors so as to differentiate between different shopping carts.

The shopping cart according to the embodiments of the present disclosure may further perform a navigation function. As shown in FIG. 5, the shopping cart according to the embodiments of the present disclosure may further include a signal transceiver 503 and a navigation signal generation device 504. The signal transceiver 503 may send a navigation request and receive target navigation path control information. The control device 502 may generate a navigation path signal according to the target navigation path control information. The navigation signal generation device 504 may generate a navigation signal according to the navigation path signal.

According to the embodiments of the present disclosure, the navigation signal generation device 504 may include a navigation ray generation unit configured to generate navigation rays according to the navigation path signal; and a direction control unit configured to control a direction of the navigation ray generation unit according to the navigation path signal.

The navigation path signal may include a start signal for the navigation ray generation unit and a direction control signal for the direction control unit. In an embodiment, the navigation ray generation unit may be a laser generator, and the direction control unit may be a steering gear on which the laser generator may be mounted. Correspondingly, the navigation path signal may include a start signal for the laser generator and a rotation angle signal for the steering gear.

According to the embodiments of the present disclosure, the shopping cart 500 may further include a direction detection unit configured to detect a direction of the shopping cart 500. The direction detection unit generates the navigation signal according to a detected direction of the shopping cart and the navigation path signal. For example, the direction detection unit detects a current direction of the steering gear, and determines a rotation angle of the steering gear according to the current direction of the steering gear and the rotation angle signal for the steering gear.

Figure 6:
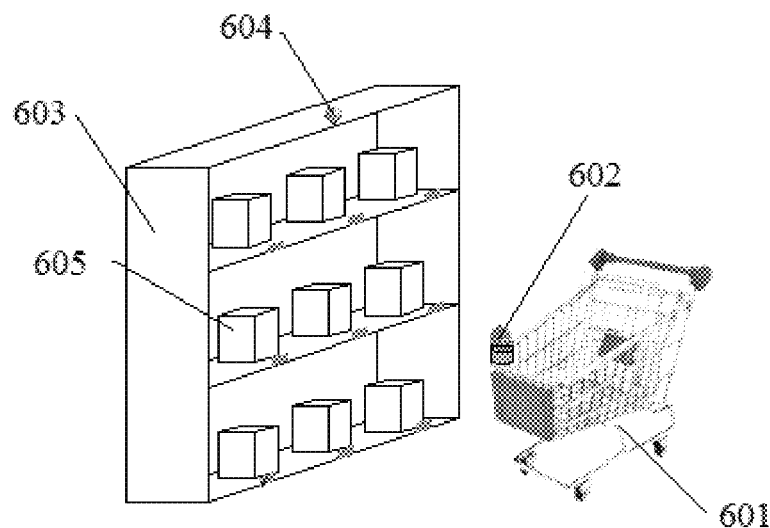
FIG. 6 is a schematic diagram illustrating a scenario of applying the positioning system according to the embodiments of the present disclosure.

FIG. 6 is a schematic diagram illustrating a scenario of applying the positioning system according to the embodiments of the present disclosure.

As shown in FIG. 6, a plurality of shelves 603 are arranged in a supermarket and are provided with various goods 605 thereon. A camera 604 is mounted at the top of a shelf for acquiring image and video information within its shooting range. A shopping cart 601 is provided with an identification signal generation device and a navigation signal generation device 602. Identification information of the shopping cart 601 may be sent by the identification signal generation device. The shopping cart 601 receives target navigation path control information, and controls the navigation signal generation device to generate a navigation signal accordingly, and a user can arrive at a target location by following the navigation signal.

Figure 7:
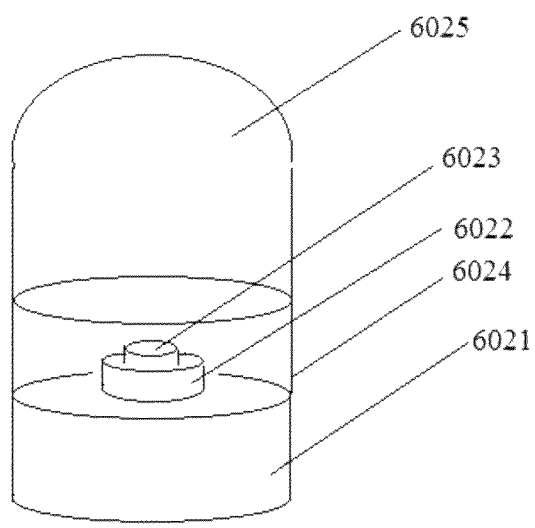
FIG. 7 is a schematic structural diagram of an identification signal generation device and a navigation signal generation device shown in FIG. 6.

FIG. 7 is a schematic structural diagram of the identification signal generation device and the navigation signal generation device 602 shown in FIG. 6.

As shown in FIG. 7, the identification signal generation device is an optical signal generator 6025, and the navigation signal generation device includes a steering gear 6022 and a laser generator 6023 mounted on the steering gear 6022. The steering gear 6022 and the laser generator 6023 are disposed on a support 6021, and the optical signal generator 6025 is provided above the support 6021 and surrounded by a housing 6024. Optical signals sent by the optical signal generator 6025 may be acquired by a camera at the top of the shelf 603. Moreover, the steering gear 6022 rotates at a certain angle according to the navigation path signal, so that the laser generator 6023 is rotated along with the steering gear 6022 and produces laser to generate the navigation signal, which allows the user to go to the target location by following the navigation signal.

Stilling referring to FIG. 5, when the shopping cart 500 arrives at the target location, it terminates the navigation function according to a received navigation end instruction. The signal transceiver 503 may be configured to receive the navigation end instruction. According to the navigation end instruction, the control device 502 may control the identification signal generation device 501 to stop generating the identification information, and control the navigation signal generation device 504 to stop generating the navigation signal. For example, as shown in FIG. 7, after the navigation function is terminated, the optical signal generator 6025 will stop generating the optical signals, the laser generator 6023 will stop generating laser signals, and the steering gear 6022 will be reset and stop rotating.

Figure 8:
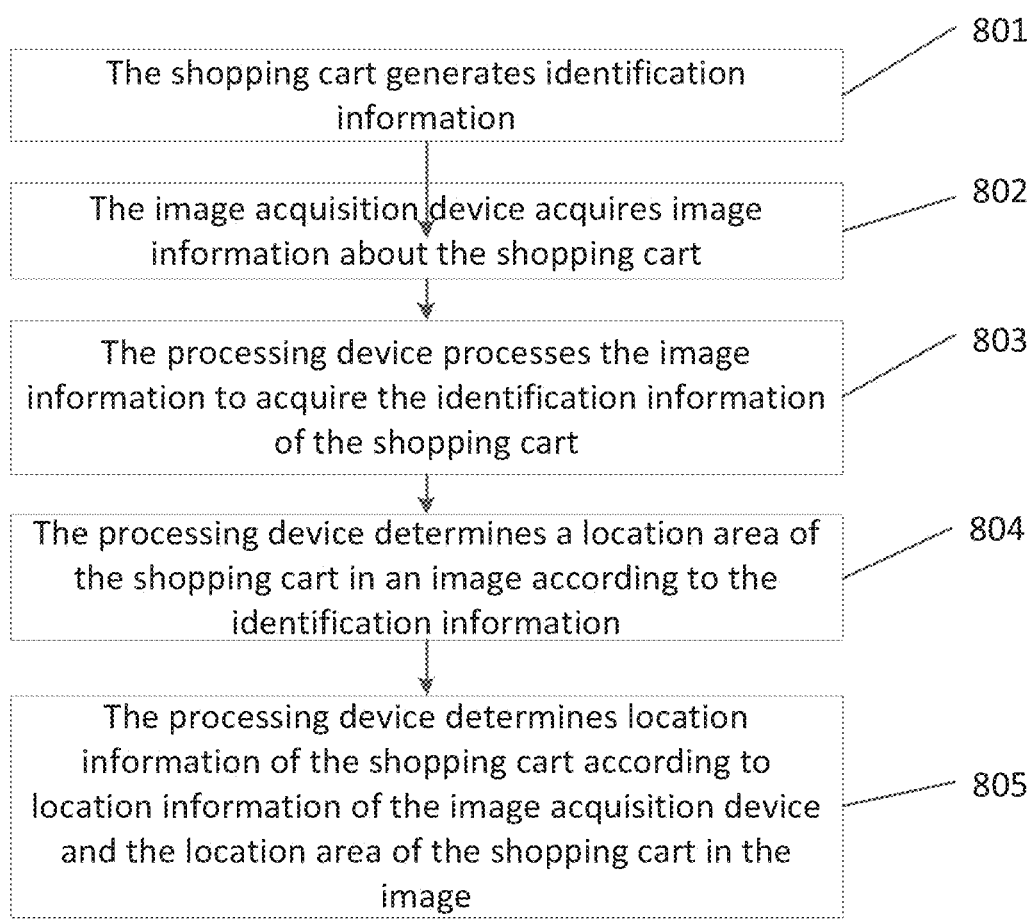
FIG. 8 is a flow chart illustrating a method of performing a positioning function by using the shopping cart according to the embodiments of the present disclosure.

FIG. 8 is a flow chart illustrating a method of performing a positioning function by using the shopping cart according to the embodiments of the present disclosure.

As shown in FIG. 8, the positioning method performed by using the shopping cart according to the embodiments of the present disclosure may include Steps 801-805.

In Step 801, the shopping cart generates identification information.

In Step 802, the image acquisition device acquires image information about the shopping cart.

In Step 803, the processing device processes the image information to acquire the identification information of the shopping cart.

In Step 804, the processing device determines a location area of the shopping cart in an image according to the identification information.

In Step 805, the processing device determines location information of the shopping cart according to location information of the image acquisition device and the location area of the shopping cart in the image.

Figure 9:
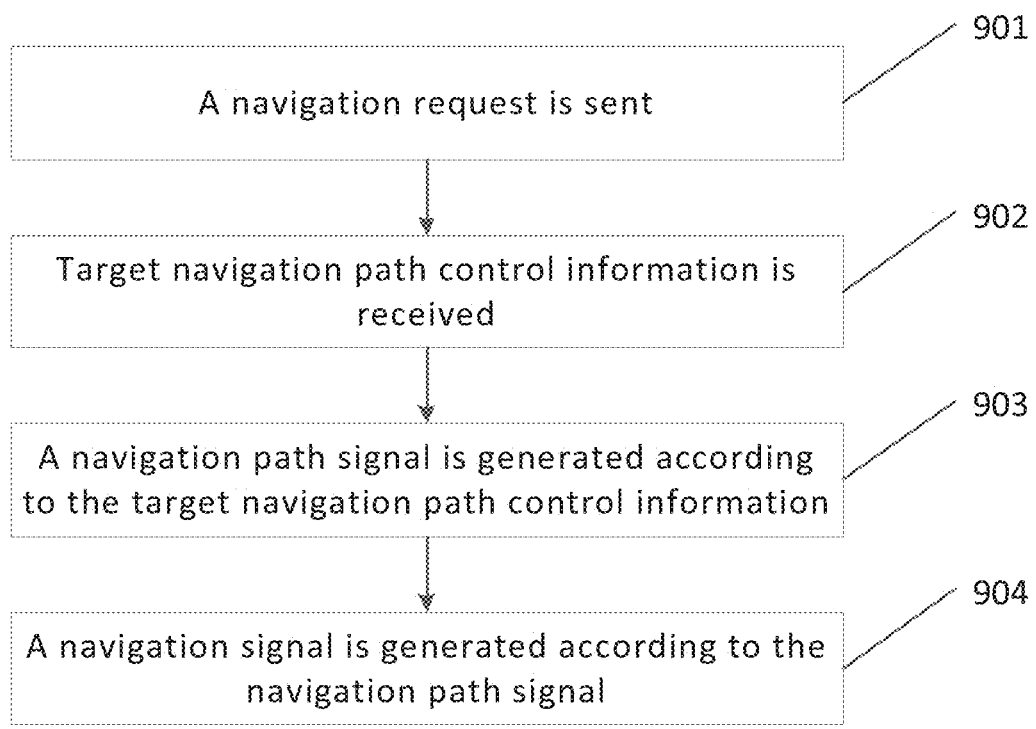
FIG. 9 is a flow chart illustrating a method of performing a navigation function by using the shopping cart according to the embodiments of the present disclosure.

FIG. 9 is a flow chart illustrating a method of performing a navigation function by using the shopping cart according to the embodiments of the present disclosure.

As shown in FIG. 9, the method of performing a navigation function by using the shopping cart according to the embodiments of the present disclosure may include Steps 901-904.

In Step 901, a navigation request is sent.

In Step 902, target navigation path control information is received.

In Step 903, a navigation path signal is generated according to the target navigation path control information.

In Step 904, a navigation signal is generated according to the navigation path signal.

The positioning system may find a current location of the shopping cart in the supermarket according to the identification information of the shopping cart, determine a target location to be reached by the shopping cart according to the navigation request sent by the shopping cart, determine a navigation path according to the current location of the shopping cart and the target location, and generate and send the target navigation path control information to the shopping cart. The shopping cart generates the navigation path signal according to the target navigation path control information, further generates the navigation signal, and then arrives at the target location from the current location by following the navigation signal.

The embodiments of the present disclosure further provide an electronic equipment for performing the positioning method of the present disclosure, which includes one or more processors, and a memory with instructions stored therein. When the one or more processors execute the instructions, the positioning method according to the embodiments of the present disclosure may be performed.

According to the embodiments of the present disclosure, the electronic equipment for performing the positioning method of the present disclosure may further include an input device and an output device. The processor, the memory, the input device and the output device are connected via buses or in other ways.

The embodiments of the present disclosure further provide a computer readable storage medium with computer programs stored thereon, and the positioning method according to the embodiments of the present disclosure may be performed when the computer programs are executed by a processor.

It should be understood by those of ordinary skill in the art that some or all of the steps in the method, the systems, and the functional modules/units in the devices disclosed above may be realized by software, firmware, hardware and suitable combination thereof. If by hardware, division of the functional modules/units is not necessarily corresponding to division of physical components; for example, one physical component may have a plurality of functions, or one function or step may be performed by combination of a plurality of physical components. Some or all of the physical components may be realized by software executed by a processor, such as a central processing unit, a digital signal processor, or a microprocessor, or realized by hardware, or realized by an integrated circuit, such as an application-specific integrated circuit. Such software may be arranged in computer readable media which may include computer storage media (or non-transitory media). As known by those of ordinary skill in the art, the term "computer storage media" includes volatile, non-volatile, removable and non-removable media used in any method or technology of storing information (such as computer readable instructions, data structures, program modules or other data). The computer storage media include, but are not limited to, RAM, ROM, EEPROMs flash memory or memory of other technologies, CD-ROM, DVD or other optical discs, magnetic cassettes, magnetic tapes, magnetic disks or other magnetic storage devices, or any other media capable of being used to store desired information and being accessed by a computer.

With the positioning system, the positioning method, the shopping cart and the electronic equipment according to all embodiments of the present disclosure, the image information about the shopping cart is acquired and processed to obtain the identification information of the shopping cart. Moreover, the location area of the shopping cart in the image may be determined according to the identification information, and the location information of the shopping cart may be determined according to the location information of the image acquisition device and the location area of the shopping cart in the image, so as to perform a function of positioning the shopping cart. Such positioning system and method are not influenced by obstacles, and can realize accurate positioning without increasing cost.

While the exemplary implementations are disclosed, it should be noted that various variations and modifications may be made without departing from the scope of the present disclosure. It should be understood by those of ordinary skill in the art that the foregoing implementations are merely exemplary implementations but make no limitation to the scope of the present disclosure. With the teaching of the present disclosure, the technical means in each embodiment or different embodiments mentioned above may be combined. Therefore, any omission, modification, equivalent substitution and improvement made within the spirit and essence of the present disclosure shall be considered to fall into the protection scope of the present disclosure.

What is claimed is:

1. A shopping cart, comprising
an identification signal generation device configured to generate identification information;
a signal transceiver device configured to send a navigation request and receive target navigation path control information;
a control device communicatively connected with the identification signal generation device and the signal transceiver device and configured to control the identification signal generation device to generate the identification information, and generate a navigation path signal according to the target navigation path control information; and
a navigation signal generation device communicatively connected with the control device and configured to generate a navigation ray according to the navigation path signal,
wherein the navigation signal generation device includes a steering gear and a laser generator mounted on the steering gear, the laser generator rotates as the steering gear rotates, the steering gear rotates according to the navigation path signal, and the laser generator is configured to generate the navigation ray according to the navigation path signal, the navigation path signal includes a start/shutdown signal for the laser generator and a rotation angle signal for the steering gear.

2. The shopping cart of claim 1, further comprising a direction detection unit configured to detect a direction of the shopping cart by determining a rotation angle of the steering gear.

3. The shopping cart of claim 1, wherein
the signal transceiver is further configured to receive a navigation end instruction, and
the control device is further configured to control the identification signal generation device to stop generating the identification information according to the navigation end instruction, and control the navigation signal generation device to stop generating the navigation signal.

4. A positioning system, comprising the shopping cart of claim 1, further comprising
an image acquisition device configured to acquire image information about the shopping cart; and
a processing device connected with the image acquisition device and configured to
process the image information so as to acquire identification information of the shopping cart,
determine a location area of the shopping cart in an image according to the identification information, and
determine location information of the shopping cart according to location information of the image acquisition device and the location area of the shopping cart in the image.

5. The positioning system of claim 4, further comprising
a signal transceiver configured to receive a navigation request sent by the shopping cart, and send target navigation path control information to the shopping cart, and
the processing device is further configured to generate the target navigation path control information according to the location information of the shopping cart and the navigation request.

6. The positioning system of claim 4, wherein the processing device comprises
a location information database configured to store an electronic map;
an image recognition module configured to
identify the image information,
determine shopping cart identification,
acquire the identification information of the shopping cart from the shopping cart identification, and
determine the location area of the shopping cart in the image according to the identification information; and
a positioning module configured to determine location information of the shopping cart in the electronic map according to the location information of the image acquisition device and the location area of the shopping cart in the image.

7. The positioning system of claim 6, wherein the shopping cart identification is color identification or optical frequency identification.

8. The positioning system of claim 5, wherein the processing device comprises
a navigation path planning module configured to plan a navigation path according to the location information of the shopping cart and the navigation request; and
a control information generation module configured to generate the target navigation path control information according to the navigation path.

9. The positioning system of claim 8, wherein the processing device further comprises
a destination detection module configured to determine whether the shopping cart arrives at a target location according to the location information and the navigation request, and generate a navigation end instruction in response to the shopping cart arriving at the target location.

10. The positioning system of claim 6, wherein
in response to recognition of no shopping cart identification in the image information, the image recognition module recognizes goods information contained in the image information.

11. The positioning system of claim 10, wherein the processing device further comprises an information analysis module configured to analyze the goods information, and upload an analysis result to a back-end server.

12. A positioning method, comprising
acquiring, by an image acquisition device in a supermarket, image information about a shopping cart;
processing the image information to acquire identification information of the shopping cart;
determining a location area of the shopping cart in an image according to the identification information; and
determining location information of the shopping cart in the supermarket according to location information of the image acquisition device in the supermarket and the location area of the shopping cart in the image,
wherein the shopping cart comprises
an identification signal generation device configured to generate identification information;
a signal transceiver device configured to send a navigation request and receive target navigation path control information;
a control device communicatively connected with the identification signal generation device and the signal transceiver device and configured to control the identification signal generation device to generate the identification information, and generate a navigation path signal according to the target navigation path control information; and
a navigation signal generation device communicatively connected with the control device and configured to generate a navigation ray according to the navigation path signal,
wherein the navigation signal generation device includes a steering gear and a laser generator mounted on the steering gear, the laser generator rotates as the steering gear rotates, the steering gear rotates according to the navigation path signal, and the laser generator is configured to generate the navigation ray according to the navigation path signal, the navigation path signal includes a start/shutdown signal for the laser generator and a rotation angle signal for the steering gear.

13. The positioning method of claim 12, further comprising
acquiring the navigation request sent by the shopping cart;
planning a navigation path according to the location information and the navigation request;
generating the target navigation path control information according to the navigation path; and
sending the target navigation path control information to the shopping cart.

14. The positioning method of claim 12, further comprising
in response to recognition of no identification information in the image information, recognizing goods information contained in the image information.

15. The positioning method of claim 14, further comprising
 analyzing the goods information; and
 uploading an analysis result to a back-end server.

16. An electronic equipment, comprising
 at least one processor; and
 a memory communicating with the at least one processor, wherein instructions are stored in the memory, and the positioning method of claim 12 is performed when the at least one processor executes the instructions.

17. A non-transitory computer readable storage medium with computer programs stored thereon, wherein the positioning method of claim 12 is performed when the computer programs are executed by a processor.

* * * * *